US008316741B2

(12) United States Patent
Wallgren

(10) Patent No.: US 8,316,741 B2
(45) Date of Patent: Nov. 27, 2012

(54) POWER TOOL AND A METHOD FOR USE OF THE POWER TOOL

(75) Inventor: Carl Johan Erik Wallgren, Stockholm (SE)

(73) Assignee: Atlas Copco Industrial Technique AB, Stockholm (SE)

( * ) Notice: Subject to any disclaimer, the term of this patent is extended or adjusted under 35 U.S.C. 154(b) by 296 days.

(21) Appl. No.: 12/746,006

(22) PCT Filed: Dec. 4, 2008

(86) PCT No.: PCT/SE2008/000681

§ 371 (c)(1), (2), (4) Date: Jun. 3, 2010

(87) PCT Pub. No.: WO2009/072951

PCT Pub. Date: Jun. 11, 2009

(65) Prior Publication Data

US 2010/0275747 A1 Nov. 4, 2010

(30) Foreign Application Priority Data

Dec. 5, 2007 (SE) ....................................... 0702694

(51) Int. Cl.
*B25B 23/151* (2006.01)
*B25B 21/00* (2006.01)
*H02P 7/00* (2006.01)

(52) U.S. Cl. ............................... 81/469; 173/1; 318/432

(58) Field of Classification Search ............ 81/467–469; 173/1, 176, 178, 181, 216, 217; 74/625; 318/432
See application file for complete search history.

(56) References Cited

U.S. PATENT DOCUMENTS 4,635,502 A * 1/1987 George ............................ 74/625
4,721,169 A 1/1988 Nagasawa et al.
4,791,838 A * 12/1988 Bickford et al. ................ 81/467
4,987,806 A * 1/1991 Lehnert ............................ 81/469
5,094,301 A * 3/1992 Wipperman et al. .............. 173/1
5,285,857 A 2/1994 Shimada
5,315,501 A 5/1994 Whitehouse
5,334,923 A * 8/1994 Lorenz et al. ................. 318/805
5,637,968 A * 6/1997 Kainec et al. ................. 318/432
5,890,406 A * 4/1999 Thorn ............................. 81/468
5,984,022 A * 11/1999 Harman et al. ............... 173/176

(Continued)

FOREIGN PATENT DOCUMENTS

EP 1 454 713 A2 9/2004

OTHER PUBLICATIONS

International Search Report dated Mar. 6, 2009 issued in International Appln. No. PCT/SE2008/000681.

*Primary Examiner* — David B Thomas
(74) *Attorney, Agent, or Firm* — Holtz, Holtz, Goodman & Chick, PC

(57) ABSTRACT

A power tool includes an electric motor including a rotor and a stator, a torque sensor for measuring the torque value during tightening of rotatable fastening elements, and an operation control unit, integrated in or in communication with the power tool. The power tool has a device for preventing rotation of the rotor. A method for tightening rotatable fastening elements by use of the power tool is also disclosed.

18 Claims, 3 Drawing Sheets

U.S. PATENT DOCUMENTS

| | | | | |
|---|---|---|---|---|
| 6,836,614 | B2 * | 12/2004 | Gilmore | 388/811 |
| 6,981,311 | B2 | 1/2006 | Seith et al. | |
| 7,562,589 | B2 * | 7/2009 | Anjanappa et al. | 73/862.23 |
| 7,936,140 | B2 * | 5/2011 | Wei | 318/432 |
| 8,096,211 | B2 * | 1/2012 | Cho et al. | 81/57.39 |
| 2002/0175656 | A1 | 11/2002 | Matsunaga et al. | |
| 2007/0012121 | A1 | 1/2007 | Hsieh | |
| 2008/0098863 | A1 * | 5/2008 | Kaneyama et al. | 81/468 |
| 2009/0014192 | A1 * | 1/2009 | Ito et al. | 173/1 |
| 2009/0165609 | A1 * | 7/2009 | Cho et al. | 81/470 |

* cited by examiner

POWER TOOL AND A METHOD FOR USE OF THE POWER TOOL

This application is a U.S. National Phase Application under 35 USC 371 of International Application PCT/SE2008/000681 filed Dec. 4, 2008.

TECHNICAL FIELD

The present invention relates to a power tool and a method for tightening rotatable fastening elements by use of the power tool.

BACKGROUND

When tightening rotatable fastening elements by use of power tools in controlled power tool systems, a desired torque value has to be fed in to the operation control unit of the power tool for a preselected work. This is usually done by means of a keyboard in connection to the control unit, by directly inputting the numerical desired torque value. Another usual technique is a flip-setting device, in which the desired torque value is preset by pushing a button or turning a knob in connection to the operation control unit. Subsequently the power tool is placed in engagement with the preselected fastening element and operated, by pushing the start button for operation of the electric motor, for tightening of the fastening element. Usually the power tool system is provided with surveillance means, such that the motor automatically switch off the tightening when the desired torque value is approached, and the final tightening of the fastening element to the desired torque value is carried out by slow operation of the electric motor. According to the state of the art, torque wrenches are previously known that are used for inspection or tightening by hand.

The known methods and apparatuses for presetting a desired torque value as well as tightening rotatable fastening elements to a desired torque value, are time-consuming and also relatively slow, considering also that one has to reset the torque value on a keyboard or a flip-setting device each time the desired torque value shall be altered for carrying out a new work. Hence, a problem with the prior art technique is that the tightening work is that every single work operation has to be planned in advance, by separately presetting the present torque value for each fastening element that should be tightened. Hence, there is no freedom to work in an unscheduled way, randomly chosen, when tightening a plurality of fastening elements with different desired torque values, which fastening elements are present on a construction ahead of the worker.

DESCRIPTION OF THE INVENTION

One object with the present invention is to provide a power tool and a tightening procedure that at least in part eliminates those drawbacks that are associated with apparatuses according to the state of the art. One object is further to achieve a power tool having an electric motor and a method for tightening rotatable fastening elements that are faster, less complicated and more flexible than known technique according to the prior art. Yet an additional object is to provide a power tool and a method in which working operations for tightening a plurality of fastening elements with different torque values need not be planned in detail in advance.

These objects are achieved with a power tool, according to the present invention as defined in claim 1, which comprises an electric motor including a rotor and a stator, a torque transmitter for measuring the torque value during tightening of rotatable fastening elements, and an operation control unit, integrated in or in communication with the power tool. The power tool is characterised in that the power tool comprises means for preventing rotation of the rotor.

One advantage with this solution according to the present invention is that working operations for tightening fastening elements can be carried out faster, since the power tool according to the present invention provides for simple monitoring and control during a working operation to a desired torque value simultaneously as the fastening element is tightened. In addition, one advantage is that the final tightening of a fastening element can be carried out manually by means of the power tool. Yet a further advantage is that there is preferably no need to use a keyboard or a flip-setting device for presetting the torque value, since the torque value can easily be preset by using the power tool in itself for setting the desired torque value before tightening operation by preventing rotation of the rotor and displaying the desired value during a manual preset tightening.

The present invention also relates to a method for tightening of rotatable fastening elements by use of the power tool according to the invention as mentioned above, characterised by the following steps; presetting a desired torque value by means of the operation control unit for tightening of at least one rotatable fastening element; tightening the fastening element by a first operation of the power tool by means of operating the electric motor; stopping the first operation for tightening of the fastening element before the desired torque value has been reached; restraining rotation of the rotor by activation of the means for preventing rotation of the rotor; and tightening the fastening element manually by a second operation of the power tool to the desired torque value during non-rotation of the electric motor.

Consequently, the power tool according to the present invention is preferably used in such a way that a desired torque value is preset, by manually tightening by the aid of the power tool, during observation of the instantaneous torque value on a display. Then, a tightening of one or several following fastening element(s) are carried out by ordinary operation, i.e. rotation of the rotor, by the aid of the electric motor, until the desired torque value is approached. The motor is preferably set, via the control unit, to switch off the tightening when the desired torque value is approached. Finally, the means for preventing the rotor from rotating is engaged and the final tightening is carried out manually up to the desired torque value is reached, during observation of the instantaneous torque value on said display.

Further preferred advantages, features and preferable embodiments according to the invention are evident from the claims, and also in the following description of the embodiments.

DESCRIPTION OF THE DRAWINGS

The present invention will now be described in embodiments in greater detail, with reference to the accompanying drawings, without limiting the interpretation of the invention thereto, where FIG. 1 schematically shows a power tool system, as well as principal parts inside the tool indicated in the drawing, according to a first embodiment of the present invention, and FIG. 2 schematically in a side view shows a power tool, as well as principal parts inside the tool indicated in the drawing, according to a second embodiment of the present invention.

DETAILED DESCRIPTION OF EMBODIMENTS

Figure 1:
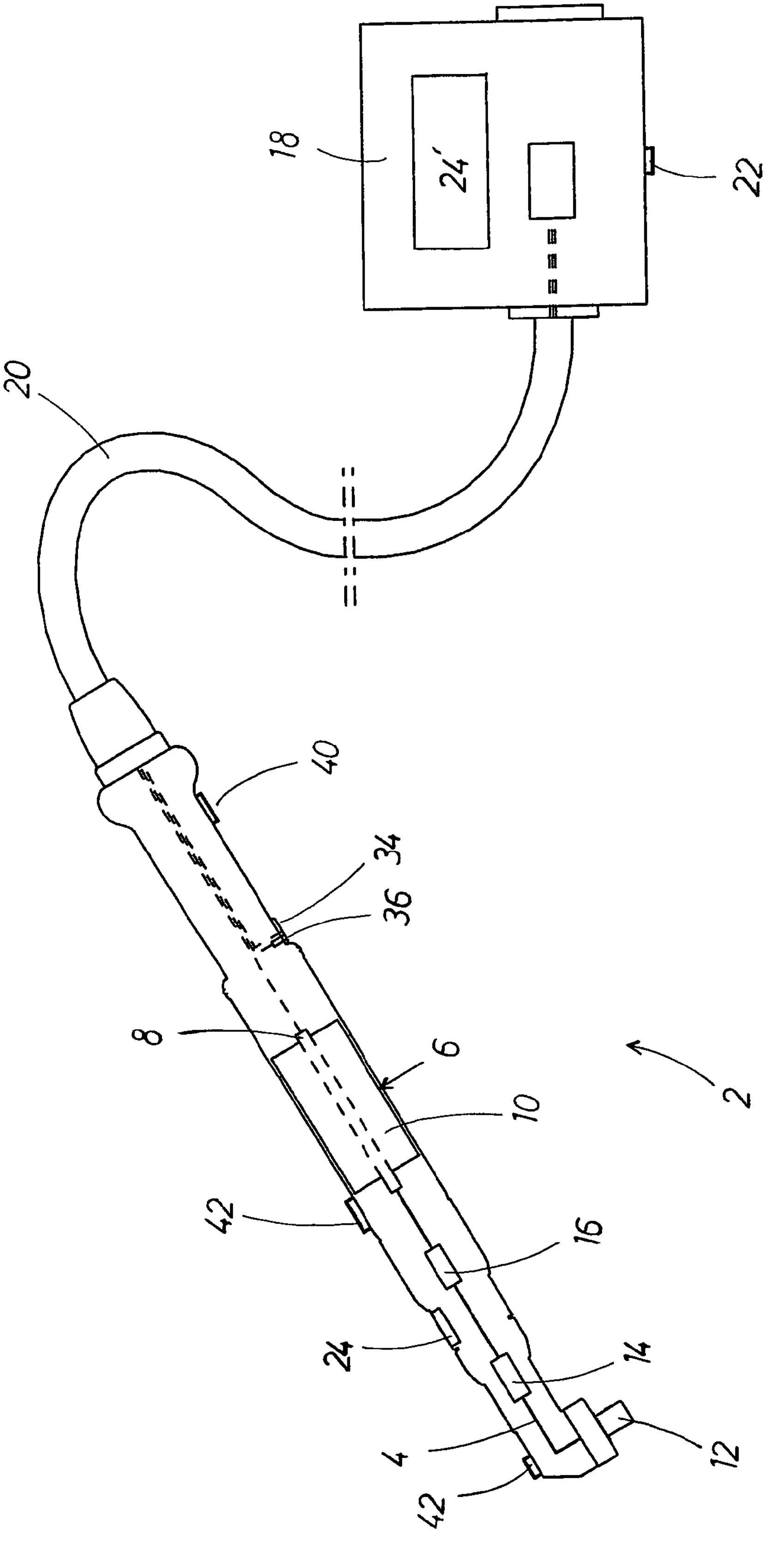

With reference to FIG. 1 is below an embodiment of a power tool and a power tool system shown and described, which power tool in this embodiment is a portable electric angled nutrunner.

Figure 2:
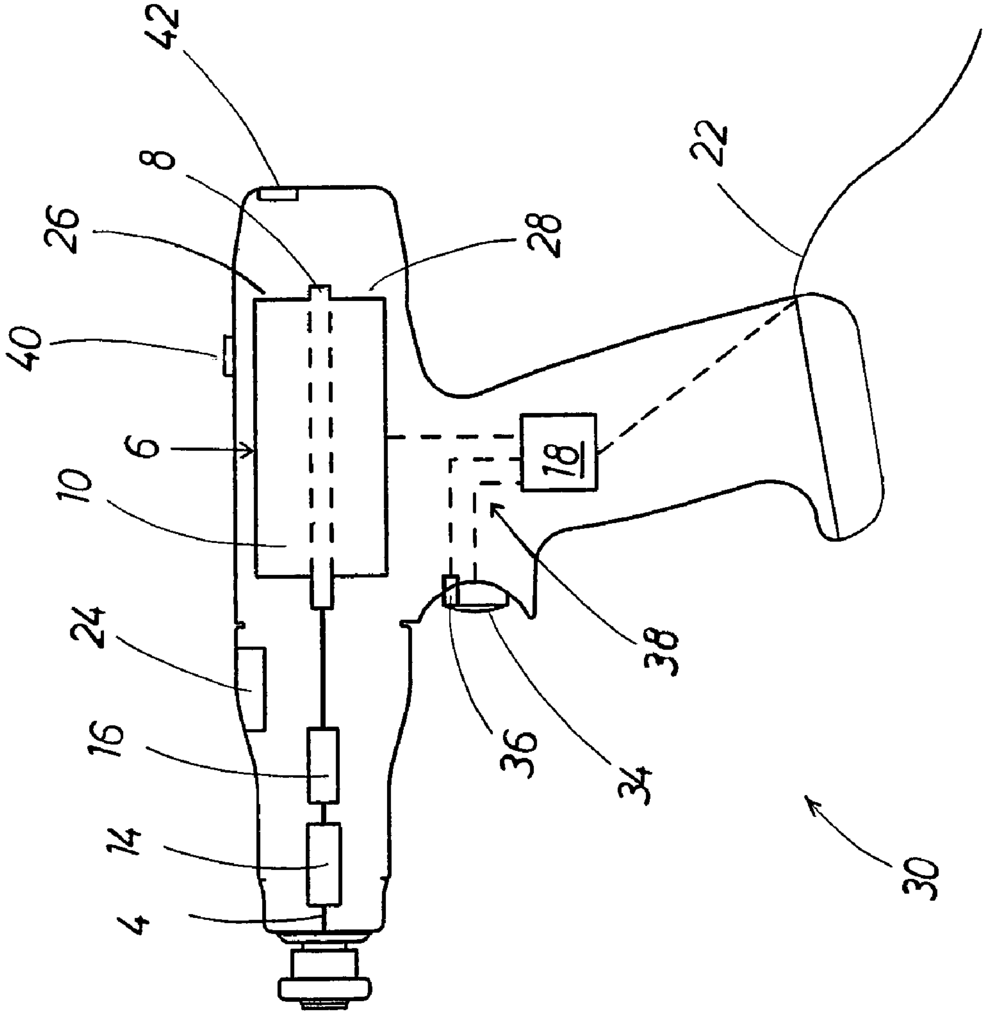
Figure 3:
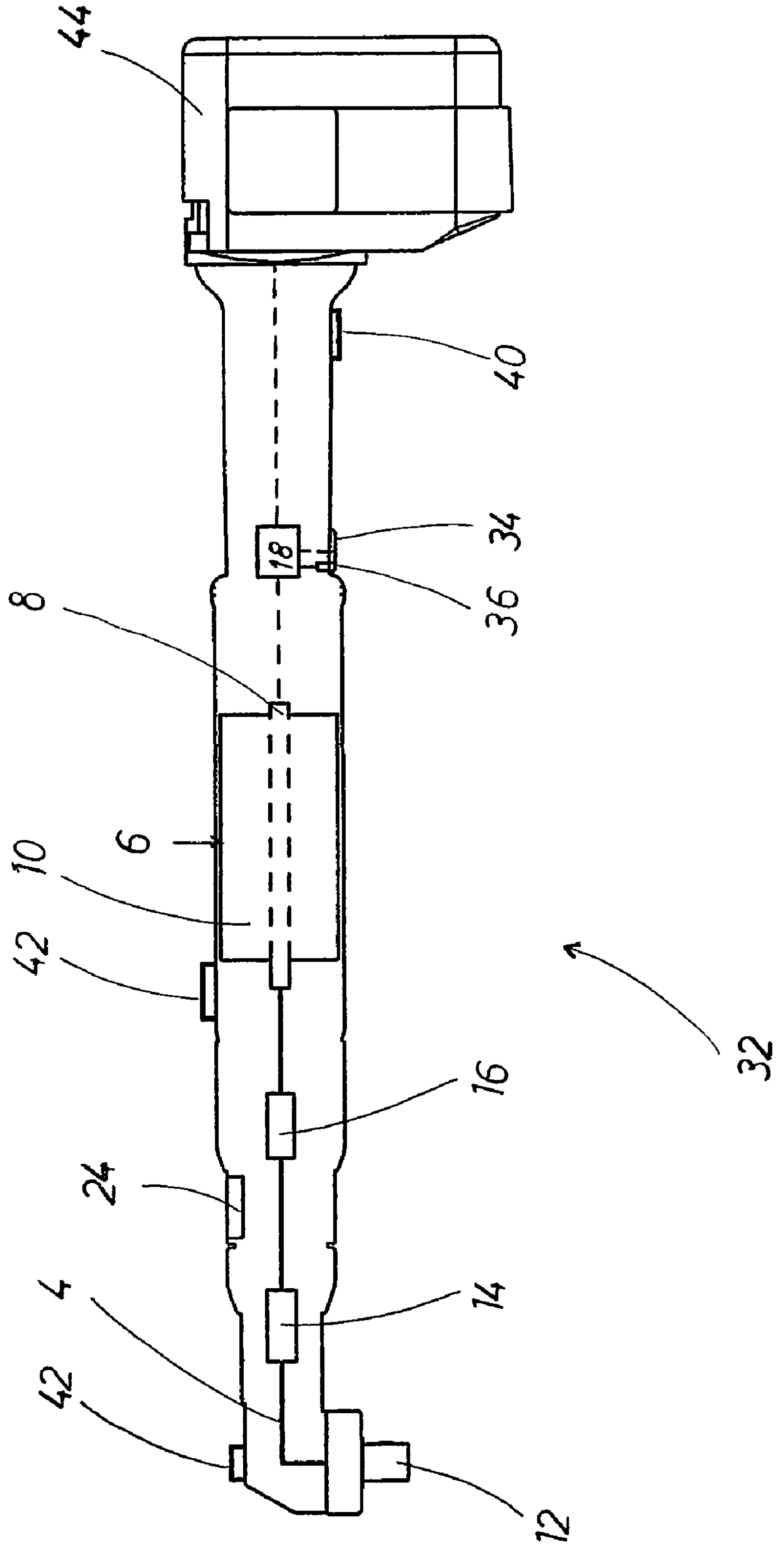
FIG. 3 schematically in a side view shows a power tool, as well as principal parts inside the tool indicated in the drawing, according to a third embodiment of the present invention.

With reference to FIGS. 2 and 3 is below another embodiment of a portable electric nutrunner shown and described. The power tool according to the present invention can be an electric or pneumatic power tool, although it is preferable that it is an electric power tool. The power tool can also be portable and in addition it can be a battery powered tool. The power tool can be a nutrunner, screwdriver, power wrench, or similar. The power tool is used for tightening of rotatable fastening elements provided with threads, such as nuts, bolts, screws, or similar.

However, in a preferred embodiment the power tool according to the present invention is an electric nutrunner, which below is described with reference to FIGS. 1, 2 and 3, respectively.

As evident from FIG. 1 it is shown a portable angled electric nutrunner 2, having a drive shaft 4 and comprising an electric motor 6 including a rotor 8 and a stator 10, which rotor 8 is arranged to the drive shaft 4 for rotation of a piece of a tool 12 at one end of the nutrunner 2 for tightening a fastening element. (not shown). The electric motor 6 is preferably a permanent magnet motor, such as a synchronous permanent magnet motor. In connection to the drive shaft 4 is a gear box 14 and a torque sensor 16 for measuring the torque value during tightening of fastening elements. The power tool system for the nutrunner 2 according to the embodiment shown in FIG. 1 comprises a stationary arranged operation control unit 18, that is in communication with the nutrunner 2 via a cable 20. A display (24, 24') can suitably be arranged on the control unit 18 casing and/or on the power tool. The control unit 18 is furthermore connected to a mains voltage via a power supply point 22.

The nutrunner 30 shown in FIG. 2 according to the second embodiment of the present invention and described here below, has most of the components and features in common with the embodiment of the nutrunner 2 as shown in FIG. 1. Hence, the same reference numerals have been used for the components and features in common, and in the following such description has been omitted. In contrast to the nutrunner 2 according to FIG. 1 described above, the nutrunners 30 and 32 according to the, second and third embodiment in FIGS. 2 and 3, have the operation control unit 18 integrated in the power tool.

In the following, reference is made to the embodiments according to FIGS. 1, 2 and 3.

The control unit 18 may for instance comprise a motor drive section, data processing section, detecting means and an integrated memory. A display, for showing operational data such as the torque value, can be integrated with the operation control unit or provided separately. However, the display 24 is preferably integrated on the power tool as evident from FIGS. 1, 2 and 3.

The nutrunner 32 shown in FIG. 3 according to the third embodiment of the present invention and described here below, has most of the components and features in common with the embodiment of the nutrunners 2 and 30 as shown in FIG. 1. and FIG. 2. Hence, the same reference numerals have been used for the components and features in common, and in the following such description has been omitted. In the third preferred embodiment of the present invention, the power tool is a portable battery powered tool in which the battery 44, the operation control unit 18 as well as the display 24, all are integrated parts in the power tool.

In accordance with the power tool of the present invention, it comprises means for preventing rotation of the rotor 8. The means for preventing rotation of the rotor can be an electrically controlled arrangement. Of course, there is also provided means for releasing the rotation of the rotor.

The electrically controlled arrangement includes means for applying current to increase a magnetic field created at the stator 10 for preventing rotation of the rotor 8. This is carried out in such a way that a stationary magnetic field is created between the poles 26, 28 of the stator (see FIG. 2), that is strong enough to stop the rotor 8 from rotating. Increased current provides for a stronger magnetic field and increased restraining of the rotor. Hence, by feeding current to the motor 6 but during non-rotation of the electric motor, fastening element tightening can be carried out manually to reach a desired torque value by using the nutrunner 2, 30, 32.

According to the present invention, an ordinary start button 34 can be arranged on the nutrunner 2, 30, 32 for activation of the rotation of the rotor of the electric motor. The power tool may, in connection to the start button 34 or via the start button 34, be provided with switch means 36 for electrically 26, 28 controlling the prevented rotation or release of the rotor 8 by the electrical arrangement 26, 28. The dotted lines shown in FIG. 2 from the control unit 18 represents some electrical connections 38 to and from the control unit 18 via the start button 34.

In addition, the electrically controlled arrangement 26, 28 provides a ratchet effect that is activated by pushing the start button 34 and/or the switch means 36. In the ratchet effect mode, the rotation of the rotor is prevented in either clock- or counter clockwise direction. The control unit 18 registers the chosen ratchet direction and communicates instructions to the control arrangement 26, 28, for preventing said rotation of the rotor. The system is more quiet, and minimises mechanical wear since the rotor is prevented to rotate by electrical means instead of the traditional mechanical ratchet mechanism while obtaining a step-less ratchet angle. The activation buttons 34, 36 can be programmed to activate the ratchet effect by different combinations. In one embodiment, the simultaneous activation of the buttons 34, 36 activates the clockwise ratchet effect while a double-click activation can trigger the clockwise alternative.

According to a preferred embodiment of the present invention, the operation control unit 18 may comprise means for presetting the desired torque value. In that respect, an instantaneous torque value during operation of the power tool can be arranged to be continuously monitored, controlled and displayed 24. Furthermore, the means for presetting the desired torque value includes a connection to the means 26, 28 for preventing rotation of the rotor 8, in order to restrain rotation of the rotor 8, and means for displaying 24 the instantaneous torque value during manual tightening of the rotatable fastening element to a desired torque value during non-rotation of the electric motor 6, and means for saving the torque value in the operation control unit 18.

According to a further embodiment of the present invention, the means 26, 28 for preventing rotation of the rotor can be arranged to release the rotor 8 when the desired torque value has been reached, to prevent torque build up.

According to yet an embodiment of the present invention, it may comprise means for providing an acoustic, vibrating or optic signal, when the desired torque value has been reached.

Such acoustic means includes a loudspeaker 40 arranged on the power tool 2, 30, 32. A lamp 42 can be arranged on the power tool as optical means for giving off a light signal. The vibrating means can be achieved by vibrating generating means (not shown) that provides a shaking effect when the desired torque value has been reached.

In operation, in accordance to the method of the present invention, for tightening of rotatable fastening elements by use of the power tool 2, 30, 32 according to present invention as defined by claim 1 or any of the embodiments mention above, the following steps are carried out: presetting a desired torque value by means of the operation control unit 18 for tightening of at least one rotatable fastening element; tightening the fastening element by a first operation of the power tool 2, 30, 32 by means of operating the electric motor 6; stopping the first operation for tightening of the fastening element before the desired torque value has been reached; restraining rotation of the rotor 8 by activation of the means 26, 28 for preventing rotation of the rotor 8; and tightening the fastening element manually by a second operation of the power tool 2, 30, 32 to the desired torque value during non-rotation of the electric motor 6.

Moreover, in accordance with a preferred embodiment of the method, the presetting of the desired torque value is carried out by: restraining rotation of the rotor 8 by activation of the means 26, 28 for preventing rotation of the rotor 8; setting the desired torque value by manually tightening a rotatable fastening element during non-rotation of the electric motor 6 by displaying 24 the instantaneous torque value; and saving the torque value in the operation control unit 18. Furthermore, the tightening of the fasting element can be carried out by: easing of the motor 6 automatically when the desired torque value is approached; restraining rotation of the rotor 8 by automatically activating the means 26, 28 for preventing rotation of the rotor 8; and stopping said first operation of the power tool 2, 30, 32 automatically, such that the manual tightening of a fastening element can be immediately started with the power tool 2, 30, 32 by the operator.

The invention claimed is:

1. A power tool comprising:

an electric motor including a rotor and a stator;

a torque sensor for measuring a torque value during tightening of rotatable fastening elements;

an operation control unit; and an electrically controlled arrangement for preventing rotation of the rotor under control of the operation control unit, wherein the power tool includes a ratchet effect mode that is activated by pushing at least one of a start button and a switch connected to the start button, whereby the operation control unit controls the electrically controlled arrangement in accordance with activation of the ratchet effect mode to prevent the rotation of the rotor in either one of two rotation directions.

2. The power tool according to claim 1, wherein the electrically controlled arrangement includes means for applying current to increase a magnetic field created at the stator for preventing the rotation of the rotor.

3. The power tool according to claim 1, wherein the power tool is battery operated, and the battery is integrated in the power tool.

4. The power tool according to claim 1, wherein a display is connected to the power tool.

5. The power tool according to claim 4, wherein the display is arranged on the power tool.

6. The power tool according to claim 4, wherein the operation control unit comprises means for presetting a desired torque value.

7. The power tool according to claim 6, wherein an instantaneous torque value during operation of the power tool is arranged to be continuously monitored, controlled and displayed.

8. The power tool according to claim 7, wherein the means for presetting a desired torque value includes:

a connection to the electrically controlled arrangement, to communicate instructions in order to restrain the rotation of the rotor;

means for displaying the instantaneous torque value during manual tightening of the rotatable fastening element to the desired torque value during non-rotation of the electric motor; and means for saving the torque value in the operation control unit.

9. The power tool according to claim 1, wherein the operation control unit is integrated in the power tool.

10. The power tool according to claim 1, wherein the operation control unit comprises means for presetting a desired torque value.

11. The power tool according to claim 10, wherein the electrically controlled arrangement is configured to release the rotor when the desired torque value has been reached, to prevent torque build up.

12. The power tool according to claim 10, further comprising means for providing an acoustic, vibrating or optic signal, when the desired torque value has been reached.

13. A method for tightening of rotatable fastening elements by use of a power tool, the power tool comprising an electric motor including a rotor and a stator, a torque sensor for measuring a torque value during tightening of rotatable fastening elements, an operation control unit, and an electrically controlled arrangement for preventing rotation of the rotor under control of the operation control unit, the power tool including a ratchet effect mode that is activated by pushing at least one of a start button and a switch connected to the start button, whereby the operation control unit controls the electrically controlled arrangement in accordance with activation of the ratchet effect mode to prevent the rotation of the rotor in either one of two rotation directions, wherein the method comprises:

presetting a desired torque value by the operation control unit for tightening of at least one rotatable fastening element;

tightening the at least one fastening element by a first operation of the power tool by operating the electric motor;

stopping the first operation for tightening of the at least one fastening element before the desired torque value has been reached;

restraining rotation of the rotor by activation of the electrically controlled arrangement; and tightening the fastening element manually by a second operation of the power tool to the desired torque value during non-rotation of the electric motor.

14. The method according to claim 13, wherein the presetting the desired torque value comprises:

restraining rotation of the rotor by activation of the electrically controlled arrangement;

setting the desired torque value by manually tightening a rotatable fastening element during non-rotation of the electric motor by displaying the instantaneous torque value on a display connected to the power tool; and saving the torque value in the operation control unit.

15. The method according to claim 13, wherein the tightening of the fastening element comprises:

easing of the motor automatically when the desired torque value is approached;

restraining rotation of the rotor by automatically activating the electrically controlled arrangement; and stopping said first operation of the power tool automatically.

16. A method for tightening of rotatable fastening elements by use of a power tool, the power tool comprising an electric motor including a rotor and a stator, a torque sensor for measuring a torque value during tightening of rotatable fastening elements, an operation control unit, a display connected to the power tool, and an electrically controlled arrangement for preventing rotation of the rotor under control of the operation control unit, the power tool including a ratchet effect mode that is activated by pushing at least one of a start button and a switch connected to the start button, whereby the operation control unit controls the electrically controlled arrangement in accordance with activation of the ratchet effect mode to prevent the rotation of the rotor in either one of two rotation directions, wherein the method comprises:

presetting a desired torque value by the operation control unit for tightening of at least one rotatable fastening element;

tightening the at least one fastening element by a first operation of the power tool by operating the electric motor;

stopping the first operation for tightening of the at least one fastening element before the desired torque value has been reached;

restraining rotation of the rotor by activation of the electrically controlled arrangement; and tightening the fastening element manually by a second operation of the power tool to the desired torque value during non-rotation of the electric motor.

17. The method according to claim 16, wherein the presetting the desired torque value comprises:

restraining rotation of the rotor by activation of the electrically controlled arrangement;

setting the desired torque value by manually tightening a rotatable fastening element during non-rotation of the electric motor by displaying the instantaneous torque value on the display; and saving the torque value in the operation control unit.

18. The method according to claim 16, wherein the tightening of the fastening element comprises:

easing of the motor automatically when the desired torque value is approached;

restraining rotation of the rotor by automatically activating the electrically controlled arrangement; and stopping said first operation of the power tool automatically.

* * * * *